(12) United States Patent
Yao et al.

(10) Patent No.: US 10,666,794 B2
(45) Date of Patent: *May 26, 2020

(54) DIALER WITH REAL-TIME REVERSE LOOK-UP INCLUDING SOCIAL DATA

(71) Applicant: Facebook, Inc., Menlo Park, CA (US)

(72) Inventors: Rose Yao, San Francisco, CA (US); Brandon Marshall Walkin, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/432,851

(22) Filed: Feb. 14, 2017

(65) Prior Publication Data

US 2017/0163799 A1 Jun. 8, 2017

Related U.S. Application Data

(63) Continuation of application No. 13/215,018, filed on Aug. 22, 2011, now Pat. No. 9,626,656.

(51) Int. Cl.
| | |
|---|---|
| *G06Q 50/00* | (2012.01) |
| *H04M 1/57* | (2006.01) |
| *H04M 3/42* | (2006.01) |
| *G06Q 10/10* | (2012.01) |
| *G06F 21/62* | (2013.01) |
| *H04M 1/725* | (2006.01) |

(52) U.S. Cl.
CPC ....... *H04M 3/4211* (2013.01); *G06F 21/6245* (2013.01); *G06Q 10/107* (2013.01); *G06Q 50/01* (2013.01); *H04M 1/575* (2013.01); *H04M 1/72552* (2013.01); *H04M 3/42102* (2013.01); *H04M 1/72583* (2013.01); *H04M 2203/655* (2013.01)

(58) Field of Classification Search
CPC ......... H04W 4/21; G06Q 10/10; G06Q 50/01; G06F 3/04817; G06F 3/048; H04L 51/14; H04L 67/1044; H04L 65/403
See application file for complete search history.

(56) References Cited

U.S. PATENT DOCUMENTS 7,908,287 B1 * 3/2011 Katragadda ........... G06F 3/0237
707/723
9,225,829 B2 * 12/2015 Ag ndez Dominguez ..................
G06Q 10/107

(Continued)

*Primary Examiner* — Aftab N. Khan
(74) *Attorney, Agent, or Firm* — Jordan IP Law, LLC (57) ABSTRACT

Methods and systems that include, by a client computing device of a first user of a social-networking system, receiving from the first user an identifier associated with an intended recipient to which outgoing communication is to be initiated, wherein the identifier is received via a user interface of an application, identifying, based on the intended recipient, social information relevant to the first user, and displaying, in the user interface, the social information that is relevant to the first user. The identifier may include a phone number or an email address of the intended recipient. The social information may include a name of the intended recipient, and/or a social-network profile of the intended recipient. The intended recipient may be a second user of the social-networking system, and the social information may be identified based on how many degrees of separation there are between the first user and the second user.

18 Claims, 5 Drawing Sheets

(56) References Cited

U.S. PATENT DOCUMENTS

| | | | |
|---|---|---|---|
| 2004/0215793 A1* | 10/2004 | Ryan | G06Q 50/01 709/229 |
| 2004/0235520 A1* | 11/2004 | Cadiz | H04M 1/2473 455/557 |
| 2009/0254417 A1* | 10/2009 | Beilby | G06N 3/004 706/45 |
| 2010/0235389 A1* | 9/2010 | Bhamidipati | G06F 16/9535 707/770 |
| 2010/0241719 A1* | 9/2010 | Agundez Dominguez | G06Q 10/107 709/206 |
| 2011/0238755 A1* | 9/2011 | Khan | H04W 4/21 709/204 |
| 2011/0276689 A1* | 11/2011 | Rosen | G06Q 30/02 709/224 |
| 2012/0083297 A1* | 4/2012 | Appelman | H04L 51/14 455/466 |
| 2012/0096352 A1* | 4/2012 | Maor | H04L 51/32 715/706 |
| 2012/0110052 A1* | 5/2012 | Smarr | H04W 4/21 709/201 |
| 2016/0081134 A1* | 3/2016 | Chow | G06Q 30/0263 455/419 |

\* cited by examiner

| Conversations | Contacts | Favorites | Keypad |
|---|---|---|---|
| [photo] | Francis Luu  650-322-4455 mobile ← 401  23 mutual friends | | ← 402 |

400

| 1 | 2 ABC | 3 DEF |
|---|---|---|
| 4 GHI | 5 JKL | 6 MNO |
| 7 PQRS | 8 TUV | 9 WXYZ |
| * | 0 + | # |
| Add to contacts | Call | ⌫ x |

FIG. 5

| Conversations | Contacts | Favorites | Keypad |
|---|---|---|---|
| | Delfina Restaurant ← 501  650-322-4455 ← 502  👋 Nan Gao and 12 others ← 503 | | ← 504 |

500

| 1 ABC | 2 ABC | 3 DEF |
|---|---|---|
| 4 GHI | 5 JKL | 6 MNO |
| 7 PQRS | 8 TUV | 9 WXYZ |
| * | 0 + | # |
| Add to contacts | Call | ⌫ x |

DIALER WITH REAL-TIME REVERSE LOOK-UP INCLUDING SOCIAL DATA

PRIORITY

This application is a continuation under 35 U.S.C. § 120 of U.S. patent application Ser. No. 13/215,018, filed 22 Aug. 2011.

TECHNICAL FIELD

The present disclosure relates generally to integration of information stored remotely at a social networking system into a real-time reverse lookup dialer application.

BACKGROUND

The advent of social networking and ubiquitous wireless data networks allow a user of the social network to remotely retrieve an enormous amount of profile data for his or her contacts, or friends, on the social network with little to no latency. The integration of mobile devices using wireless data networks allows the integration of relevant information stored on social networking systems into call dialer screens, enhancing the user experience when making voice calls or composing short message service (SMS) or email messages.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EXAMPLE EMBODIMENT(S)

Overview

Particular embodiments relate to a dialer application that pulls profile information from a social networking system. The dialer application determines whether the dialed number is associated with a friend of the user account associated with the mobile or computing device, and depending on whether the recipient is a friend, displays various information that is deemed to be relevant to the user making the call.

Implementations of the present invention extend these concepts by allowing a dialer application to make the determination locally, and display friend data that is cached locally on the mobile device. Furthermore, in the scenario where the recipient is not a friend of the member of the social network, the social networking system may still pull public profile information for display to the user making the call. Further, when the outgoing number is not associated with any particular user, but a hub page representing a business, the social network may also pull information from the hub page for display to the user. Thus the application provides a user making a call immediate, socially relevant information that he or she may reference during the call.

Figure 1:
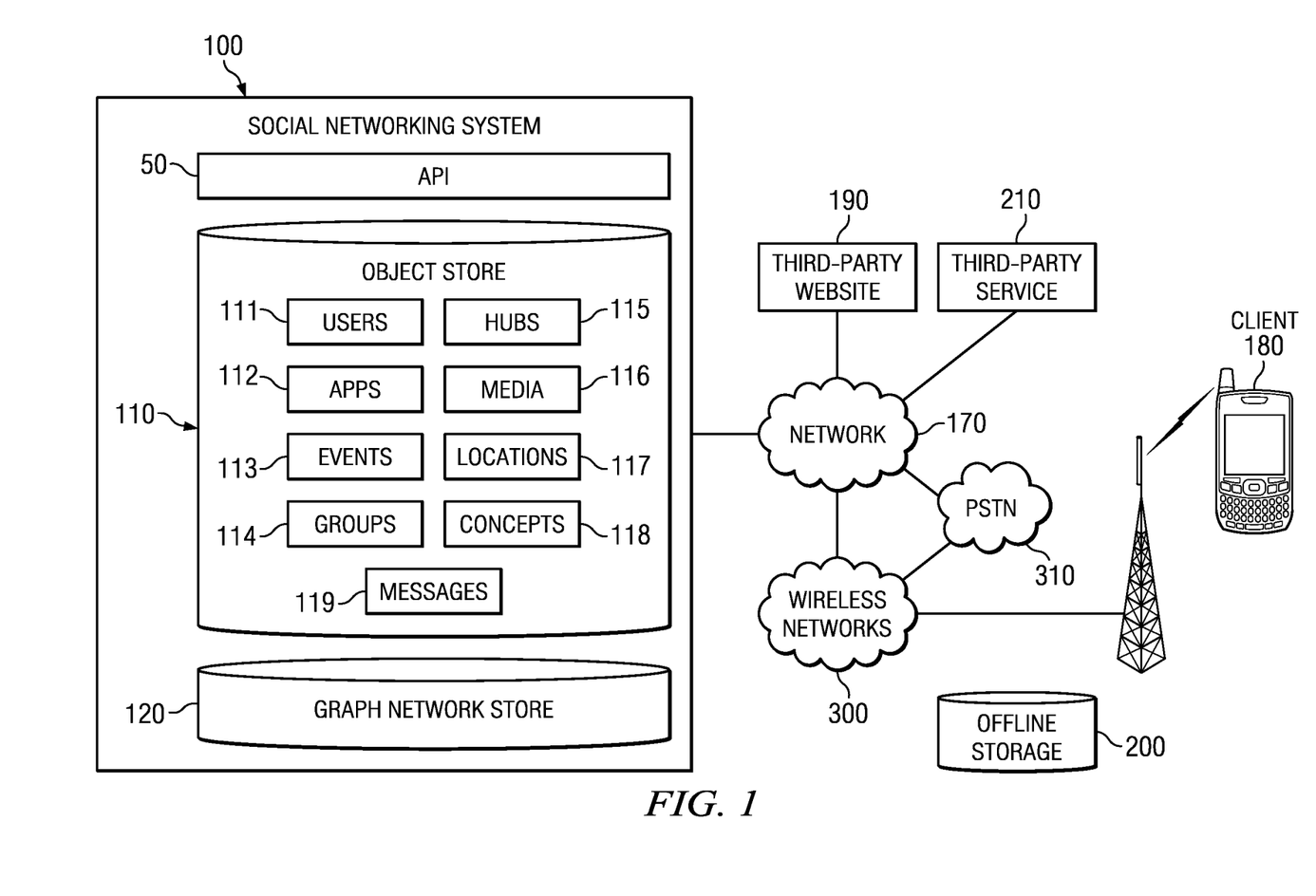
FIG. 1 illustrates an example social networking environment.

FIG. 1 is a high-level block diagram of an integrated messaging system according to one embodiment. FIG. 1 illustrates a social networking system 100, mobile device 180, wireless cellular network 300, third-party website 190, third-party communication service 210, and public-switched telephone network 310. It is understood that wireless cellular network 300 represents multiple wireless cellular networks provided by a plurality of carriers. FIG. 1 also includes offline storage 200 that is local to mobile device 180. Mobile device 180 is depicted as a mobile phone, but mobile device 180 may comprise any type of computing device, including mobile phone, laptop, netbook tablet, cable box, television, etc. Mobile device 180 is any computing device capable of receiving a call, whether it is a VoIP call through a packet-based data network 180, or a voice call from circuit-switched networks such as PSTN 310. Mobile device 180 has one or more memories capable of storing call, text, and other messaging data, depicted in FIG. 1 as offline storage 200.

Mobile device 180 interacts with external websites 190 and other service providers 210 through a web browser residing on the client device, or a dedicated application local to mobile device 180. For example, mobile device 180 may interact with third-party instant VoIP service 210, such as Google Voice™ or Skype™, by visiting and logging into their account via a web browser, or by installing and running a dedicated application. The same applies for video calls via third-party service providers 210 such as Apple FaceTime™ or Tango. This disclosure contemplates any type of third-party service provider 210 connected to network 170 or PSTN 300.

A user of mobile device 180 interacts with social networking system 100 via an application, such as a web browser or a native application, to perform operations such as browsing content, posting and sending messages, retrieving and sorting messages received from other users, and the like. Messages can be in any electronic message format such as electronic mail ("e-mail") messages, chat messages, comments left on a user's webpage, and short message service (SMS) text messages. Messages can contain plain text, or they can contain other content such as pictures, videos, and attachments. Each user has a mailbox that includes messages that are both sent and received by the user. Mobile device 180 may also use an application or browser to pull and view profile information for various user nodes and hubs in social networking system 100.

Mobile device 180, connected through wireless network 300, may also interact with other client devices through the circuit-switched, or non-data, portion of wireless network 300. For example, a user at mobile device 180 may transmit and receive a non-VoIP call to a cellular phone or landline in PSTN 310, transmit and receive a text or multi-media message through the SMS or MMS channels, or receive push notifications through the SMS control channel.

Additionally, third party website 190 can also interact with the social networking system 100 via a system-provided application programming interface (API) 50. For example, the third party website can perform operations supported by the API, such as delivering messages to the social network system 100, retrieving messages stored by the social networking system 100, and obtaining social information about users of the social networking system 100.

Social networking system 100 comprises an object store 110, and a graph information store 120. Object store 110 stores information on objects, such as users, represented in or by the social networking environment 100. Graph information store 120 stores information on the relationships of the objects in object store 110.

In particular embodiments, the social graph information includes a first set of user nodes that each correspond to a respective user, and a second set of concept nodes that each correspond to a respective concept. As used herein, a "user" may be an individual (human user), an entity (e.g., an enterprise, business, or third party application), or a group (e.g., of individuals or entities) that interacts or communicates with or over such a social network environment. As used herein, a "concept" may refer to virtually anything that a user may declare or otherwise demonstrate an interest in, a like towards, or a relationship with, such as, by way of example, a sport, a sports team, a genre of music, a musical composer, a hobby, a business (enterprise), an entity, a group, a third party application, a celebrity, a person who is not a registered user, etc. In particular embodiments, each node has, represents, or is represented by, a corresponding web page ("profile page") hosted or accessible in the social network environment.

By way of example, a user node may have a corresponding user profile page in which the corresponding user can add content, make declarations, and otherwise express him or herself, while a concept node may have a corresponding concept profile page ("hub") in which a plurality of users can add content, make declarations, and express themselves, particularly in relation to the concept. In particular embodiments, the social graph information further includes a plurality of edges that each define or represent a connection between a corresponding pair of nodes in the social graph. In particular embodiments, profile information for user nodes is stored in user store 111, while hub page information for concepts, such as businesses, is stored in hubs store 115. Nodes directly connected by a friend edge are considered one degree of separation away, and are listed as "friends" on the social network. Users of the social network may specify elements or portions of their profile which may be viewed only by friends, or friends of friends (second degree contacts). In particular embodiments, users may define privacy settings that only allow certain groups or individual members of the social network to view portions of their profile. For further detail on hubs, please see U.S. patent application Ser. No. 12/763,171 titled, "Integrated Social Network Environment," previously filed on Apr. 19, 2010 and fully incorporated by reference herein.

Figure 2:
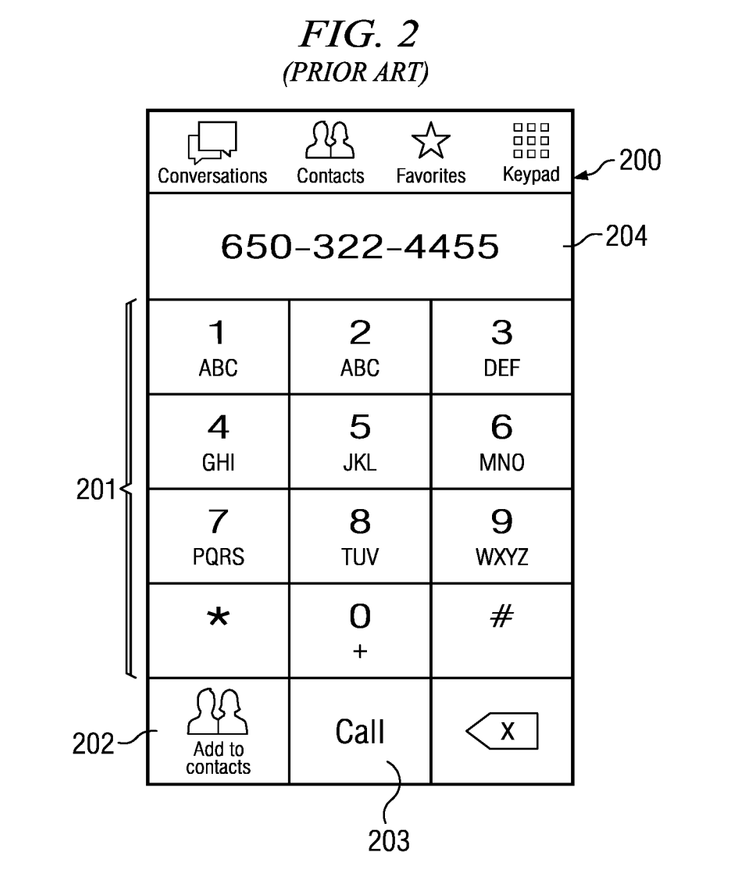
FIG. 2 illustrates an example prior art dialer interface.

FIG. 2 illustrates an example prior art interface 200 displayed to a user when the user's client (or mobile) device 180 makes a call. In particular embodiments, interface 200 is a touch screen that includes numeric keypad 201 for entering a phone number. In particular embodiments, interface 200 may include a physical keypad. Interface 200 also includes a button 202 to add a given dialed number to a list of contacts, and a call button 203 that initiates communication to the dialed number. As discussed earlier, in particular embodiments, one or more of these touchscreen interfaces may be substituted for physical buttons. Interface 200 also includes display area 204 that displays the inputted telephone number. Display area 204 allows the user to visually verify that he or she has entered the correct number, to the extent that the user has memorized the correct number, before initiating a voice call via call button 203.

Figure 3:
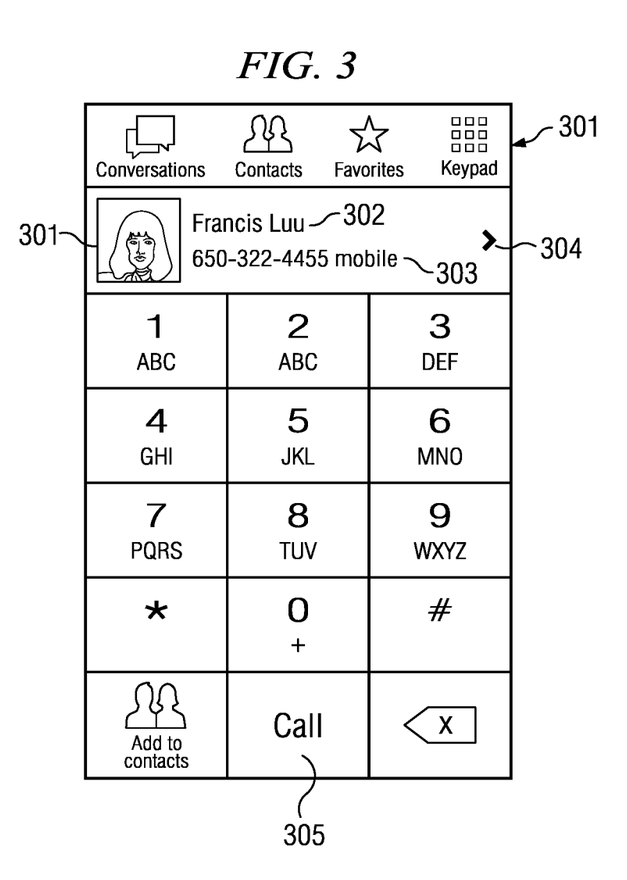
FIG. 3 illustrates an example interface implementing a reverse lookup for a friend of the user.

FIG. 3 illustrates an example interface 300 displayed to the user of mobile device 180 when the user inputs a phone number associated with one of the user's friends on social networking system 100. Instead of merely displaying the entered number, as in display area 204, interface 300 includes display area 302 that displays relevant information about a member of the social networking system whose phone number matches the entered number. In particular embodiments, the relevant social information is stored remotely on the social networking server, and the information is pulled by mobile device 180 for display. In particular embodiments, the relevant social information is pre-cached by mobile device 180 and stored in offline storage 200. The dialer application, upon retrieving the relevant social information on the particular member, such as the member's name, displays the information in display area 302. In particular embodiments, relevant social information may include the profile picture 301 of the particular member. In particular embodiments, dialer application may display an indicator 303 as to what type of number the user has entered. For example, in FIG. 3, the entered number is the mobile phone number of the particular member. This allows the user to quickly verify that he or she has entered an appropriate number for the particular member, such as entering the particular member's office number during working hours. In particular embodiments, the dialer application may also display user-selectable button 304 in display area 302. When actuated, user-selectable button 304 causes the dialer application, or alternatively, another application residing on mobile device 180, such as a browser or dedicated social networking application, to display the profile associated with the member displayed in display area 302. The user may desire to, prior to hitting call button 304, quickly browse the intended recipients profile page for milestones, such as birthdays, job placements, etc. or random information from status updates, check-ins, and the like for small-talk subject matter, thus facilitating the appearance that the user is deeply engaged or genuinely concerned with the life of the intended call recipient.

Additionally, a user may more quickly visually verify that he or she has entered the correct number even in the situation where the user has incorrectly memorized the number. For example, if the user intends to call Francis Luu, enters the number, but fails to see profile information for Francis Luu, the user immediately knows he or she has entered an incorrect number.

Figure 4:
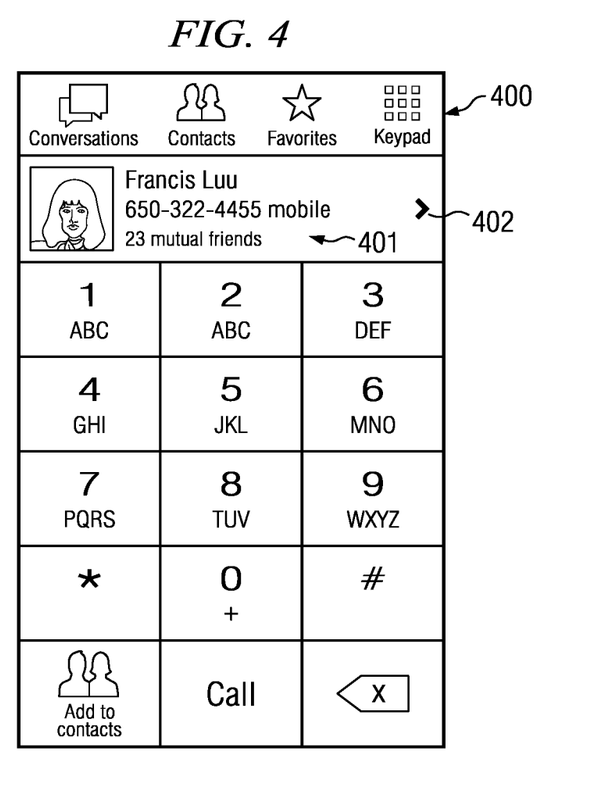
FIG. 4 illustrates an example interface implementing a reverse lookup for a non-friend of the user.

FIG. 4 illustrates an example interface 400 displayed to the user of mobile device 180 when the user enters a number associated with a member of social networking system 100 that is not one of the users first degree contacts or friends. Interface 400 is substantially similar to interface 300, and displays the intended recipient's name, entered phone number, and type of phone number. In particular embodiments, interface 400 also includes mutual friend indicator 401 that displays how many mutual friends, or shared first-degree connections, the user and intended recipient have on social network 100. In particular embodiments, mutual friend indicator 401 is selectable, and when selected, the dialer application displays the mutual friends to the user. Interface 400 also includes user-selectable button 402 that operates in substantially the same manner to user-selectable button 304.

In all cases where the users actuates user-selectable button 304 and 402 to view the intended recipient's social networking profile, the information displayed to the user is subject to one or more privacy policies maintained by social networking system 100. For example, the intended recipient may only choose to display some information publicly, or to members of certain networks. Thus, where the user and intended call recipient are not friends, the information displayed to the user is limited to the privacy settings of the intended recipient and the relationship information between the two stored in the social graph. Even in the scenario where the user and the intended call recipient are friends, or first-degree contacts, the intended recipient may have privacy settings limiting the display of any given piece of information from any given member or groups of members. The social data displayed to the user by the dialer application is limited by these policies and the relationship information between the user and the recipient stored in the social graph.

Figure 5:
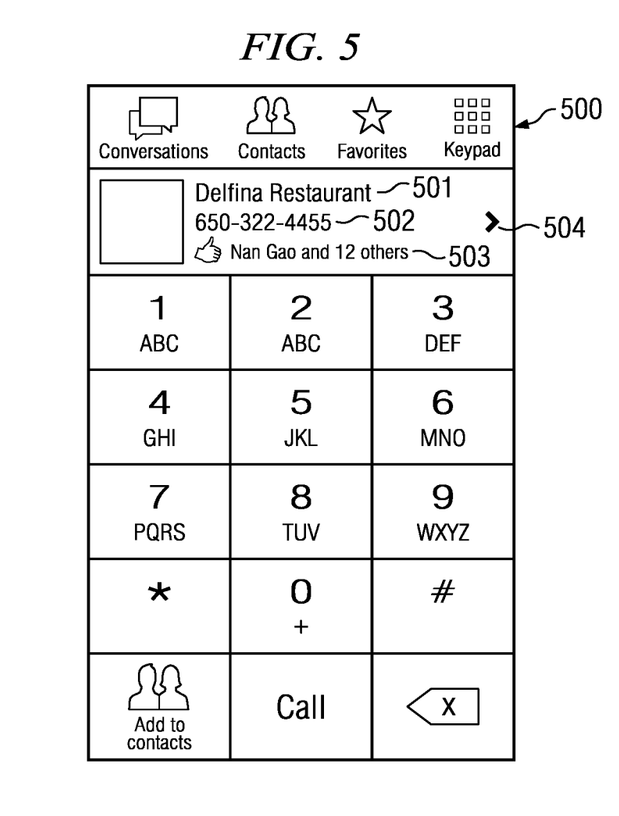
FIG. 5 illustrates an example interface implementing a reverse lookup for a business or hub.

FIG. 5 illustrates an example interface 500 displayed to the user of mobile device 180 when the user enters a number that is associated with a non-user entity in social networking system 100. For example, a local business may choose to create a profile page, or a hub page, representing the business on social networking system 100. If the entered phone number matches the phone number listed on the local business's hub page, dialer application may display information relating to the hub page to the user. In particular embodiments, the local business does not have to explicitly create the hub page. In particular embodiments, a user may create the hub page for the business, or social networking system 100 may create the hub page by accessing online directories or yellowpages. Hub pages may be associated with any entity that is not a user. For example, in particular embodiments, hub pages may be associated with businesses, governmental entities, celebrities, specific places, affinity groups, and the like. So long as the hub page has a phone number associated with it, the dialer application will display relevant social information pulled from the hub page to the user entering a matching number.

Interface 500 contains socially relevant information retrieved from the hub page associated with the entered number. In particular embodiments, interface 500 includes the name 501 of the entity associated with the hub page, in this example, "Delfina Restaurant." Interface 500 may also include the entered number 502, and, in particular embodiments, socially-relevant information 503 tailored to the specific user of mobile device 180. For example, in FIG. 5, 503 displays how many of the user's friends "like" the detected entity. In particular embodiments, temporally-sensitive social information, such as if friends of the user recently checked into the physical location associated with the hub page, may have a higher priority than other social information. This disclosure contemplates any ranking of display of any relevant social information on interface 500.

Interface 500 similarly includes user-selectable button 504, which, when actuated, displays the hub page or a portion thereof to the user. In particular embodiments, mobile-specific information retrieved from the hub page, such as a map to the physical location associated with the hub page, hours of operation, or the like, may be displayed. This disclosure contemplates the display of any suitable portion of the hub page associated with the entered phone number.

The dialer application displays interfaces 300, 400, and 500 substantially simultaneously with the user's input of a user identifier. Although the foregoing examples describe a user entering a phone number, this disclosure contemplates all types of communications and associated user identifiers. In particular embodiments, this outgoing communication is a SMS or MMS text message, and the user identifier is a phone number. In particular embodiments, the outgoing communication is a VoIP call, and the communication source is an account (generally a username) for the VoIP service. In particular embodiments, the communication is a video chat, and the communication is an account (usually a username) for the video chat service. In other embodiments, the incoming communication is an e-mail, direct message from a third-party site, instant message, SMS/MMS message, and the like. Although this disclosure primarily pertains to real-time full-duplex communications, all other forms of communication are contemplated.

Figure 6:
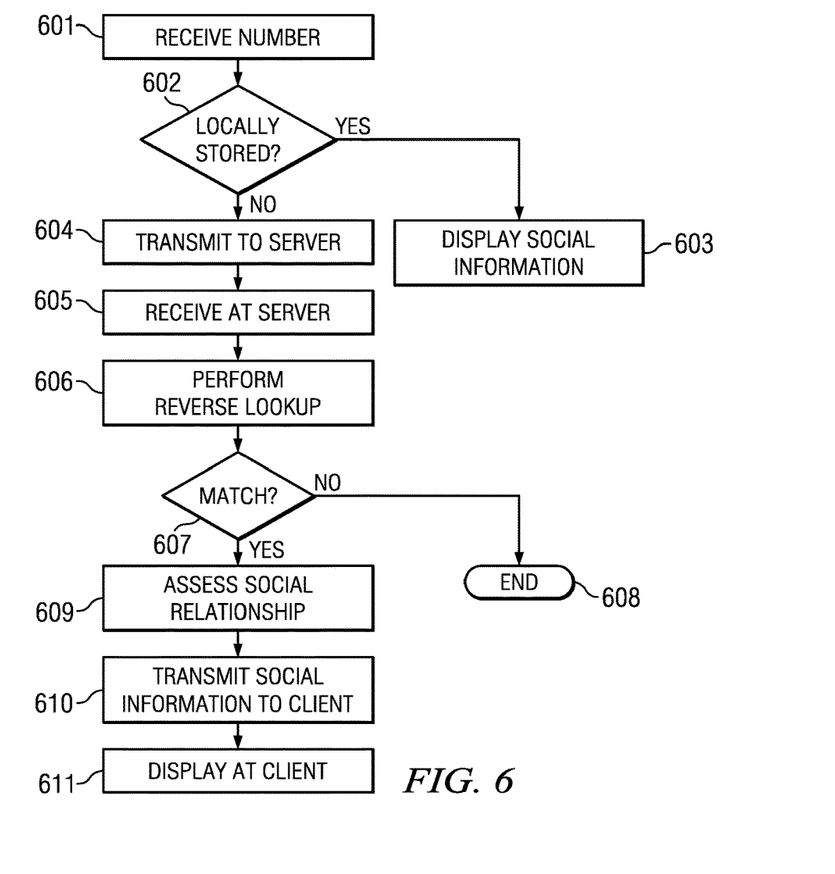
FIG. 6 is a flowchart illustrating an example method of displaying social information for a dialed contact.

FIG. 6 is a flowchart illustrating an example method of displaying social dialer screens 300, 400, and 500. At step 601, mobile device 180 receives, via a user interface, touchscreen, or physical buttons, an identifier of an intended recipient, in this example, the phone number of a recipient of a voice call. As disclosed, this disclosure contemplates any form of communication, and is not limited to real-time full-duplex communications. For didactic purposes, however, FIG. 6 assumes the communication is a voice call.

At Step 602, mobile device 180 performs a reverse lookup of the stored contacts in offline storage 200. Reverse lookups are well-known in the art and are not discussed in detail here. In particular embodiments, dialer application performs the reverse lookup substantially in real-time, narrowing the potentially matching contacts as each digit is entered by the user. In particular embodiments, the dialer application performs the reverse lookup only after all the digits, for example, ten digits in the United States, have been received. This disclosure contemplates any manner or algorithm for performing a reverse lookup.

If the dialer application at Step 602 determines, as a result of the reverse lookup, that the phone number matches a number stored in association with a friend of the user whose data is pre-cached in offline storage 200, dialer application displays the relevant social information at Step 603. The pre-caching of social information may occur at any given time. In particular embodiments, the information is downloaded and stored whenever the user adds a new friend on social networking system 100. In particular embodiments, the information is downloaded and stored periodically. In particular embodiments, the information is downloaded and stored in response to a synchronization operation. This disclosure contemplates any manner of timing the download and storage, or pre-caching, of friend information. In particular embodiments, because the relevant social information is relatively limited, it is possible to efficiently store all the user's contacts in offline storage 200.

If the dialer application at Step 602 determines, as a result of the reverse lookup, that the phone number does not match the numbers stored in association with any of the users friends in offline storage 200, the dialer application transmits the entered number to social networking system 100 at Step 603. In particular embodiments, the dialer application also transmits a user identifier of the member account associated with the user of mobile device 180 to the server. In particular embodiments, the user of mobile device 180 associates a social networking user ID with mobile device 180 when he or she first uses the device, and the user ID is transmitted through a specialized application on mobile device 180. In other embodiments, the user ID is explicitly transmitted in all transmissions to the social networking system 100. In other embodiments, the user ID is associated on the server-side of the social networking system with a client device identifier, such as a phone number, IMSI, IMEI, or the like. Regardless, the social networking system associates mobile device 180 with a particular member, called the "user" in this disclosure for purposes of simplicity.

In particular embodiments, mobile device 180 maintains an always-on connection via network 170 to the servers of social networking system 100. In particular embodiments, mobile device 180 initiates a connection with social networking system 100 via network 170 when the dialer application is launched. This disclosure contemplates any suitable manner of connection initialization and management known those of ordinary skill in the art.

At Step 604, an application residing on one or more servers of social networking system 100 receives the entered number. As will be discussed with regard to FIG. 7, the server need not receive the entire number simultaneously to begin the reverse lookup. Given the vast number of phone numbers stored in social networking system 100, it may be beneficial to begin the reverse lookup as soon as the first digit is received by mobile device 180.

At Step 606, the application residing on one or more of the servers performs a reverse lookup for users or other entities associated with the received phone number, and determines whether a matching entity resides in social networking system 100 at Step 607. User store 111 and hubs store 115 may store phone numbers in conjunction with particular members or concept nodes of the social network. The application attempts to match the number with a number existing in user store 111 or concept store 118. After finding a match, the application looks up the social networking user identifier for the user or concept node associated with the number. In particular embodiments, member phone numbers (or other identifiers) may be stored by the user on his or her own profile. In other embodiments, a first user may store phone numbers for a second user in his or her own online phonebook. Naturally, in such a scenario, the reverse lookup would return the user ID of the second user. In particular embodiments, the IDs represent user or concept nodes in the social graph.

If the server cannot find a match, then the process ends at Step 608. In particular embodiments, at Step 608, mobile device 180 displays the prior art dialer screen depicted in FIG. 2. In particular embodiments, mobile device 180 displays the prior art dialer screen depicted in FIG. 2 until social data is received from the server.

If the application residing on one or more servers of social networking system 100 determines that the received number matches one associated with an entity of social networking 100, at Step 609 the application assesses the relationship between the user transmitting the number and the entity associated with the number by accessing social graph network store 120. The application residing on one or more of the servers of social networking system 100 accesses the graph network store to determine the relationship, if any, between the calling user node and the recipient node.

As discussed earlier, the user's access to the member's information depends on one or more privacy policies of social networking system 100, or one or more privacy policies of a member associated with the received number. After analyzing the social relationship between the user and the entity matching the received number, the application transmits the relevant social information, subject to the aforementioned privacy policies, to mobile device 180 in Step 610.

At Step 611, mobile device 180 displays the received social information as depicted in FIGS. 3-5. Because of the latency of network 170, it is possible that the user may be ready to call before the social information is received from the servers of social networking system 100. In such a case, the social information is simply not displayed. In particular embodiments, dialer application displays a "loading" icon on interfaces 400 or 500 to indicate that a match has been found, and that the download of socially relevant information is in progress.

Figure 7:
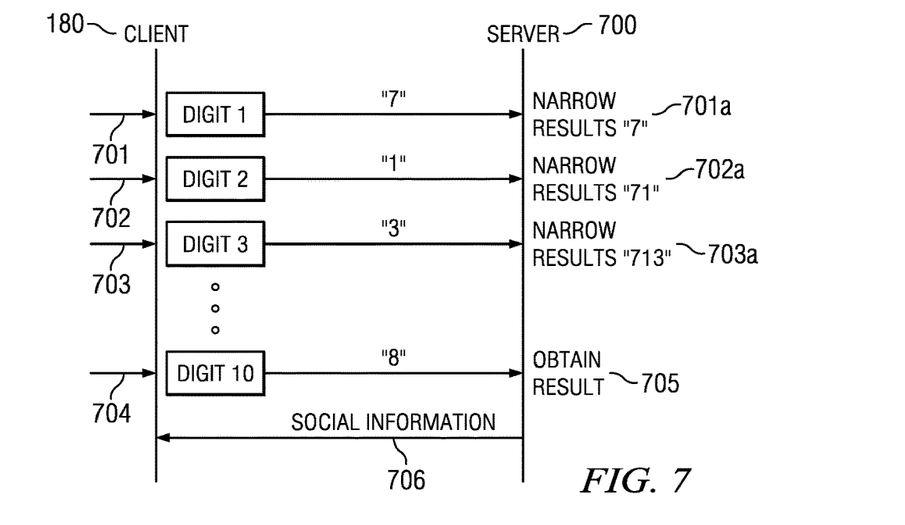
FIG. 7 is a call flow diagram depicting the interaction between a mobile device and server in accordance with one embodiment of the invention.

FIG. 7 is a call flow diagram between client/mobile device 180 and one or more servers 700 of social networking system 100 in accordance with one embodiment of the invention. As previously discussed, due to the sheer number of stored profiles and phone numbers in user store 111, it may not be feasible to begin the reverse lookup process of Step 606 after the user has entered the full phone number. Thus, in particular embodiments, it may be beneficial to begin the reverse lookup process on the server as each digit is received. In Step 701, the user enters the first digit through the dialpad, in this case "7", and immediately mobile device 180 transmits the number "7" to server 700.

In Step 701a, server 700, immediately upon receiving the first digit ("7"), eliminates all stored phone numbers beginning with digits other than "7" from the set of potential matches. Similarly, in step 702, the user enters the second digit of the phone number, in this example "1", and mobile device 180 immediately transmits the digit to server 700. Similarly, in Step 702a, server 700 narrows the set of potential matching phone numbers to numbers beginning with "71." This process repeats itself until Step 704, where the last digit is received. In this example, the number is a U.S. 10-digit phone number, but this disclosure contemplates phone numbers or identifiers of any length. Additionally, although not shown, this disclosure contemplates sending a "delete" or "back" command from mobile device 180 to server 700 if the user chooses to delete the previous number due to mistakes in entry.

At Step 705, an application residing on server 700 obtains the result of the reverse lookup corresponding to a user ID identifying a specific user or entity of social networking system 100. Subject to the privacy check of Step 609, the application residing on server 700 obtains the socially relevant information, and in Step 706 transmits the information back to client/mobile device 180. In this manner, it is possible to dramatically reduce the time required to perform the server-side reverse lookup.

Figure 8:
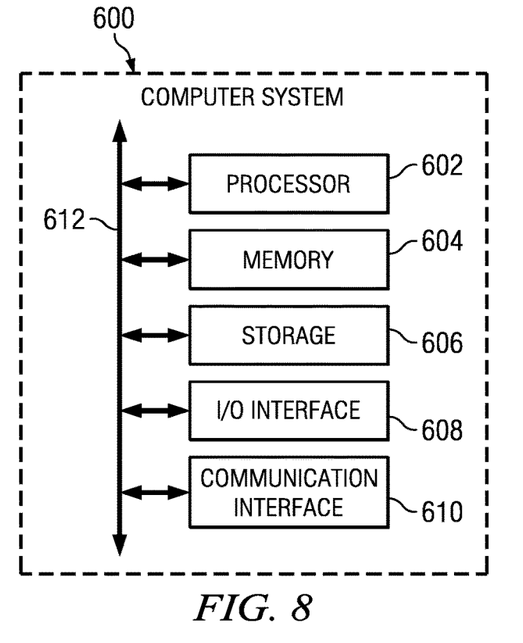
FIG. 8 illustrates an example computing system.

FIG. 8 illustrates an example computer system 800, which may be used with some embodiments of the present invention. This disclosure contemplates any suitable number of computer systems 800. This disclosure contemplates computer system 800 taking any suitable physical form. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. One or more memory buses (which may each include an address bus and a data bus) may couple processor 802 to memory 804. Bus 812 may include one or more memory buses, as described below. Although this disclosure describes and illustrates particular memory, this disclosure contemplates any suitable memory.

In particular embodiments, storage 806 includes mass storage for data or instructions. Storage 806 may be internal or external to computer system 800, where appropriate. This disclosure contemplates mass storage 806 taking any suitable physical form. Where appropriate, storage 806 may include one or more storages 806. Although this disclosure describes and illustrates particular storage, this disclosure contemplates any suitable storage.

In particular embodiments, I/O interface 808 includes hardware, software, or both providing one or more interfaces for communication between computer system 800 and one or more I/O devices. One or more of these I/O devices may enable communication between a person and computer system 800. This disclosure contemplates any suitable I/O devices and any suitable I/O interfaces 808 for them. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. This disclosure contemplates any suitable network and any suitable communication interface 810 for it. Although this disclosure describes and illustrates a particular communication interface, this disclosure contemplates any suitable communication interface.

In particular embodiments, bus 812 includes hardware, software, or both coupling components of computer system 800 to each other. Although this disclosure describes and illustrates a particular bus, this disclosure contemplates any suitable bus or interconnect.

The client-side functionality described above can be implemented as a series of instructions stored on a computer-readable storage medium that, when executed, cause a programmable processor to implement the operations described above.

Figure 9:
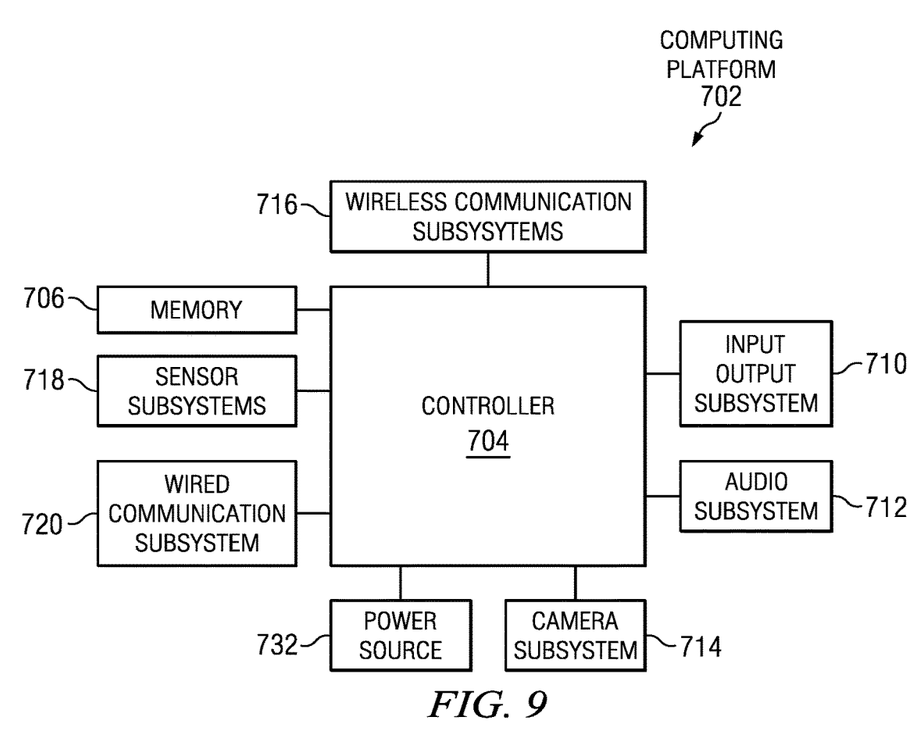
FIG. 9 illustrates an example mobile device.

While mobile device 180 may be implemented in a variety of different hardware and computing systems, FIG. 9 shows a schematic representation of the main components of an example computing platform 902, according to various particular embodiments. Multipoint sensing devices generally include a controller 904 which may comprise a microcontroller or one or more processors configured to execute instructions and to carry out operations associated with a computing platform. Controller 904 may optionally contain a cache memory unit for temporary local storage of instructions, data, or computer addresses. By way of example, using instructions retrieved from memory, controller 904 may control the reception and manipulation of input and output data between components of computing platform 902.

Controller 904 together with a suitable operating system may operate to execute instructions in the form of computer code and produce and use data. The operating system, other computer code (including control client 908 described below) and/or data may be physically stored within a memory block 906 that is operatively coupled to controller 904.

Memory block 906 encompasses one or more storage media and generally provides a place to store computer code (e.g., software and/or firmware) and data that are used by the computing platform 902. By way of example, any of a number of suitable memory cards may be loaded into computing platform 902 on a temporary or permanent basis.

Controller 904 is also generally coupled to a variety of interfaces such as graphics control, video interface, input interface, output interface, and storage interface, and network interface, and these interfaces in turn are coupled to the appropriate devices. In certain embodiments, Controller 904 may connected to an input structure 914 and display 916 may be provided together, such an in the case of a touch-screen where a touch sensitive mechanism is provided in conjunction with the display 916.

Electric signals (e.g., analog) may be produced by microphone 910 and fed to earpiece 912. Controller 904 may receive instruction signals from input structure 914 and control the operation of display 916. Audio signals may be transmitted and received by means of an antenna 918 that may be connected through a radio interface 920 or audio input interface such as microphone 924 to codec 922 configured to process signals under control of controller 904. Additionally, multipoint sensing devices may be powered power source 932.

Mobile device may also include one or more user input devices 934 (other than input structure 914) that are operatively coupled to the controller 904. Generally, input devices 934 are configured to transfer data, commands and responses from the outside world into multipoint sensing devices.

Display device 916 is generally configured to display a graphical user interface (GUI) that provides an easy to use visual interface between a user of the computing platform 902 and the operating system or application(s) running on the mobile device.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, although the foregoing embodiments have been described in the context of a social network system, it will apparent to one of ordinary skill in the art that the invention may be used with any electronic social network service and, even if it is not provided through a website. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method comprising:
   by a client computing device of a first user of a social-networking system, receiving from the first user an identifier associated with an intended recipient to which outgoing communication is to be initiated, wherein the identifier is received via a user interface of an application;
   by the client computing device, identifying, based on the intended recipient, a plurality of pieces of social information, wherein each piece of social information is based at least in part on one or more actions performed on the social-networking system with respect to the intended recipient by one or more other users who are connections of the first user;
   by the client computing device, displaying, in the user interface, the plurality of pieces of social information, wherein at least one of the pieces of social information is temporally-sensitive, and the temporally-sensitive piece of social information comprises one or more actions performed on the social-networking system with respect to the intended recipient at one or more associated times by the one or more other users who are connections of the first user,
   wherein the pieces of social information are displayed in a ranked order in which at least one piece of temporally-sensitive social information has a higher ranking than other social information,
   wherein the intended recipient is a second user of the social-networking system, and the social information is identified based on how many degrees of separation there are between the first user and the second user,
   wherein the social information comprises a count of how many first-degree connections are shared between the first user and the second user in the social-networking system,
   by the client computing device, displaying, in the user interface, an indicator that displays the count of how many first-degree connections are shared between the first user and the second user; and
   by the client computing device, when the indicator is selected, displaying, in the user interface, the first-degree connections that are shared between the first user and the second user.

2. The method of claim 1, wherein the identifier comprises a phone number or an email address of the intended recipient.

3. The method of claim 1, wherein the social information comprises a name of the intended recipient, a social-network profile of the intended recipient, or a combination thereof.

4. The method of claim 1, wherein the count of how many first-degree connections are shared comprises a count of mutual friends of the first and second users.

5. The method of claim 1, wherein the first-degree connections that are shared between the first user and the second user comprise mutual friends of the first and second users.

6. The method of claim 1, wherein the outgoing communication comprises a text message, a VoIP call, a video chat, or a combination thereof.

7. The method of claim 1, wherein the social information is subject to one or more privacy policies associated with the intended recipient in the social-networking system.

8. The method of claim 7, wherein there are two or more degrees of separation between the first and second users, and the social information is limited to public information in the social-networking system.

9. The method of claim 7, wherein there are two or more degrees of separation between the first and second users, and the social information is limited to the one or more privacy policies of the intended recipient and relationship information that associates the first and second users.

10. The method of claim 7, wherein there is one degree of separation between the first and second users, and the one or more privacy policies limit the display of one or more pieces of the social information from one or more members of the social-networking system.

11. The method of claim 1, wherein the intended recipient represents an entity that is associated with a page in the social-networking system, the page is associated with the identifier, and the one or more pieces of social information are associated with the page.

12. The method of claim 11, wherein the social networking system creates the page by accessing one or more online directories, and the entity comprises a business, governmental entity, celebrity, place, or a combination thereof.

13. The method of claim 11, wherein the one or more actions performed on the social-networking system with respect to the intended recipient by one or more other users who are social connections of the first user comprise "liking" the entity, and the social information comprises a count of how many of the first user's friends in the social-networking system "like" the entity.

14. The method of claim 11, wherein the social information comprises a map to a physical location associated with the page, hours of operation of the entity, or a combination thereof.

15. The method of claim 11, wherein the one or more actions performed on the social-networking system with respect to the intended recipient at one or more associated times comprise one or more check-ins to a physical location associated with the page.

16. The method of claim 15, wherein the temporally-sensitive piece of social information indicates that one or more friends of the user have recently checked into the physical location associated with the page.

17. One or more computer-readable non-transitory storage media embodying software that is operable when executed to:
receive, from a first user of a social-networking system, an identifier associated with an intended recipient to which outgoing communication is to be initiated, wherein the identifier is received via a user interface of an application;
identify, based on the intended recipient, a plurality of pieces of social information, wherein each piece of social information is based at least in part on one or more actions performed on the social-networking system with respect to the intended recipient by one or more other users who are connections of the first user;
display, in the user interface, the plurality of pieces of social information, wherein at least one of the pieces of social information is temporally-sensitive, and the temporally-sensitive piece of social information comprises one or more actions performed on the social-networking system with respect to the intended recipient at one or more associated times by the one or more other users who are connections of the first user,
wherein the plurality of pieces of social information are displayed in a ranked order in which at least one piece of temporally-sensitive social information has a higher ranking than other social information,
wherein the intended recipient is a second user of the social-networking system, and the social information is identified based on how many degrees of separation there are between the first user and the second user,
wherein the social information comprises a count of how many first-degree connections are shared between the first user and the second user in the social-networking system,
display, in the user interface, an indicator that displays the count of how many first-degree connections are shared between the first user and the second user; and
when the indicator is selected, display, in the user interface, the first-degree connections that are shared between the first user and the second user.

18. A system comprising: one or more processors; and a memory coupled to the processors comprising instructions executable by the processors, the processors being operable when executing the instructions to:
receive, from a first user of a social-networking system, an identifier associated with an intended recipient to which outgoing communication is to be initiated, wherein the identifier is received via a user interface of an application;
identify, based on the intended recipient, a plurality of pieces of social information, wherein each piece of social information is based at least in part on one or more actions performed on the social-networking system with respect to the intended recipient by one or more other users who are connections of the first user;
display, in the user interface, the plurality of pieces of social information, wherein at least one of the pieces of social information is temporally-sensitive, and the temporally-sensitive piece of social information comprises one or more actions performed on the social-networking system with respect to the intended recipient at one or more associated times by the one or more other users who are connections of the first user,
wherein the plurality of pieces of social information are displayed in a ranked order in which at least one piece of temporally-sensitive social information has a higher ranking than other social information,
wherein the intended recipient is a second user of the social-networking system, and the social information is identified based on how many degrees of separation there are between the first user and the second user,
wherein the social information comprises a count of how many first-degree connections are shared between the first user and the second user in the social-networking system,
display, in the user interface, an indicator that displays the count of how many first-degree connections are shared between the first user and the second user; and
when the indicator is selected, display, in the user interface, the first-degree connections that are shared between the first user and the second user.

* * * * *